Patented July 29, 1947

2,424,671

UNITED STATES PATENT OFFICE 2,424,671

PROCESSES OF PRODUCING OXIDIZED HYDROCARBON WAXES

Ernest Stossel, New York, N. Y.

No Drawing. Application January 20, 1945,
Serial No. 573,806

13 Claims. (Cl. 196—142)

1

The present application is a continuation in part of my co-pending United States patent application, Ser. No. 412,597, filed on the 27th day of September, 1941, and entitled "Process of producing high-melting-point waxes" and a continuation in part of my co-pending United States patent application, Ser. No. 463,778, filed on the 29th day of October, 1942, and entitled "Processes of producing oxidation products" and also a continuation in part of my co-pending United States patent application, Ser. No. 561,502, filed on the 1st day of November, 1944, and entitled "Processes of producing high melting point waxes."

The present invention relates to processes of producing oxidation products from crude oil containing a high percentage of wax bearing substances, and more particularly to processes of producing such oxidation products from crude oil tank bottoms.

It is one of the objects of my present invention to obtain in an efficient and easy way, by simple processes, various oxidation products directly from dehydrated crude oil tank bottoms, crude oil emulsions and other wax-bearing substances which contain not only high melting point waxes and heavy oils but also asphaltic ingredients, oxidation inhibiting constituents and hydrocarbons which are liquid at ordinary temperatures, such as light oils and gasoline.

It is a further object of my present invention to avoid the usual solvent treatments for separating the precipitate consisting mainly of high melting point waxes from the heavy oils which treatments are not only cumbersome and expensive but also require very special equipment for the handling of the solvents in order to eliminate losses.

It is still a further object of my present invention to produce oxidation products from deposits which settle in the form of emulsions when crude oils containing wax bearing substances are stored.

It is another object of my present invention to greatly simplify and shorten the time needed for production of oxidation products from tank bottoms and similar crude oils by processes which eliminate the necessity of a separate solvent separation step after removal of the light oils and gasoline.

Still another object of my present invention is to provide a process which makes it possible to obtain oxidation products from crude oil without any solvent treatment with expensive solvents.

Still a further object of my present invention consists in eliminating the necessity of removal of oxidation inhibiting constituents present in

2 the crude oil serving as initial material for the oxidation products to be obtained.

Finally, it is also an object of my present invention—and actually one of the most important—to eliminate the oxidation inhibiting effects of the so-called oxidation inhibiting constituents present in the crude oil during oxidation by converting these oxidation inhibiting constituents into oxidation furthering constituents, i. e. into so-called oxidation activators, without the need of distillation or the necessity of removal of these constituents.

It is well-known that usual wax base stocks produced by reducing tank bottoms, i. e. by the removal of the light oils and lower melting point waxes by distillation, still contain heavy oils besides high melting point waxes; in the conventional processes, such heavy oils have to be removed after distillation by cumbersome, lengthy and expensive solvent treatments before the base stocks can be subjected to oxidation.

In order to avoid the presence of asphaltic bodies during distillation, it is known to separate such asphaltic ingredients already before distillation by proper treatment, e. g. with sulphuric acid. However, this does not affect the necessity of solvent treatment after distillation, since the obtained wax base stock still contains heavy oils which have to be removed, in the conventional commonly used processes, by separate solvent treatment before oxidation. Thus, in the usual processes for producing oxidizable wax base stocks free of heavy oils, the wax-bearing crude oil is first subjected to an acid treatment to remove the asphaltic ingredients, then reduced to remove the light oils, and finally subjected to a complicated treatment to remove the heavy oils; this latter treatment consists usually in dissolving the wax base stock obtained by reduction in an appropriate solvent at an elevated temperature, thereafter cooling or chilling the thus obtained solution to a temperature sufficiently low to effect precipitation of the wax, removal of the precipitated substantially oil free wax base stock by low pressure or vacuum filtration, washing of the thus removed wax base stock with cold solvent, and finally removal of this wash solvent by distillation. It is often necessary to repeat such dissolving, cooling and removal of the wax several times in order to obtain a wax base stock absolutely free of heavy oils.

During all solvent treatments, for instance those described above, it is important that the wax precipitated from the solvent is not too voluminous or porous, does not retain large amounts of solvents and dissolved oils, and shows good washing qualities. With many types of oils or solvents, it is necessary to add so-called crystallization modifiers to the waxy oil solution before chilling in order to obtain a slurry which can be filtered without substantial losses. The weight of the solvent present in the so-called dry cake after filtering is sometimes two to four times that of the wax and this solvent, of course, contains a high percentage of heavy oil; this heavy oil cannot be removed otherwise than by repeated separate washing operation. It is therefore of utmost importance in all solvent treatments to obtain the wax cake in a compact form showing good washing qualities.

The most various solvents have been used for solvent treatment; however, since the so-called liquid petroleum solvents, i. e. the liquid members of the aliphatic hydrocarbon series exercises a marked swelling and solvating effect on refined, i. e. deasphaltized micro-crystalline waxes, it was generally assumed that it is inadvisable to use such liquid petroleum solvents for the removal of heavy oils from waxes; this is the reason that it is customary to use only very specific rather expensive solvents as ethylene dichloride, methylethyl-ketone and similar solvents which have only a slight swelling or solving effect on refined waxes. Since, as stated above, such solvents are expensive, complicated processes have to be used to recover them after the treatment so as to eliminate losses of the same.

I have found that I can use for my new processes liquid petroleum solvents, since the presence of asphaltic bodies in the crude oil greatly reduces the congealing tendencies of the amorphous waxes in the crude oil solution; therefore, such asphaltic bodies are very useful as so-called wax separation aids in case liquid petroleum solvents are used. This is the reason that in case de-asphalted wax base stocks are subjected to solvent treatments, such solvents have to be chosen with particular care so as not to swell or solvate the wax crystals, since as mentioned above the structure assumed by the wax when precipitated from the solvent is of utmost importance.

By using asphalt containing crude oils, tank bottoms or solutions thereof, I am able to use liquid petroleum solvents which are inexpensive and do not require any complicated processes.

It is also well-known that there have been many proposals to produce various oxidation products such as acids, aldehydes, ketones and alcohols from various type of hydrocarbons, particularly from various waxes. Relatively high quality products have been obtained from purified hydrocarbons, as for instance refined paraffins and waxes, but up to now there was no possibility to oxidize hydrocarbon residues such as tank bottoms containing impurities without at least partial cracking and decomposition of the high boiling point constituents, particularly the high melting point waxes contained in the residues.

However, it is of great importance to enable oxidation of such residues without cracking and decomposition, since the same contain a very high percentage of hydrocarbons having great chain length and high molecular weight; if oxidized without cracking and decomposition such hydrocarbons would be transformed into oxidized waxes of high molecular weight, great hardness and low viscosity. Therefore, it would be very desirable to enable partial oxidation of such residues, since it would be an easy way to obtain oxidation products of high molecular weight from cheap raw materials which are available in great quantities.

As described above, in the way proposed by me it is possible to obtain a precipitate from hydrocarbon residues of the type disclosed which contains mainly high melting point waxes and is substantially free of so-called heavy oils. This precipitate may be de-asphalted so as to remove the asphaltic impurities which would inhibit oxidation.

However, I have observed that even such a de-asphalted oilfree precipitate obtained from hydrocarbon residues still contains—even after it has been separated from asphaltic impurities and heavy oils—certain oxidation inhibitors which prevent or at least inhibit oxidation of this precipitate if the same is subjected to oxidation by a gas containing oxygen in the usual way.

In order to remove these inhibitors, it has been suggested to subject the hydrocarbons to be oxidized to a separate distillation step, the primary purpose of which is to separate the bulk of the wax from a small percentage of less volatile material which prevents oxidation. It has also been suggested to subject the hydrocarbons to be oxidized to a separate refining step by repeated treatment with fuming sulphuric acid. In all these processes, the highest molecular weight hydrocarbons, i. e. the highest melting point waxes are more or less attacked either by cracking and decomposition during distillation or by their reaction with fuming sulphuric acid which at least partially destroys them.

In accordance with my present invention, it is unnecessary to remove oxidation inhibitors from the precipitate to be oxidized; on the contrary, my new process enables transformation of these oxidation inhibitors into oxidation furthering and activating ingredients:

This new process is based upon my finding that the oxidation inhibitors contained in a precipitate obtained from crude oil in the manner proposed by me above, consist mainly of higher mercaptans or similar high melting point sulphur compounds which are precipitated during cooling together with the high molecular solid hydrocarbons, particularly the high melting point waxes, and not removed thereafter by any of the usual refining steps. It is known that these mercaptans have a higher melting point than the usual high melting point waxes and are less soluble than the same in most of the solvents used for wax separation; these mercaptans are very resistant to heat treatment and are not removed during a distillation which removes only the lower boiling point hydrocarbons, i. e. the lower melting point waxes and light oils, but does not attack, i. e. subject to cracking and decomposition the high melting point waxes contained in the precipitate. Such mercaptans are only slightly attacked by the conventional sulphuric acid treatment used for de-asphalting the precipitate and are not removed at all by the clay or fuller's earth treatment carried out for bleaching purposes. Thus, it is evident that these oxidation inhibiting mercaptans or similar sulphur compounds are still present in the acid treated and bleached precipitate. Since distillation at high temperatures and pressure and other known treatments used up to date for removal of such inhibitors would also attack the high molecular weight constituents, particularly the high melting point waxes contained in the precipitate, other means for enabling oxidation despite presence of these mercaptans have to be found.

I have discovered that it is of great advantage to carry out the oxidation of the precipitate in the presence of certain compounds defined below in detail which are adapted to react with the mercaptans present in the precipitate so as to form certain other compounds which in turn react with the oxygen added during oxidation so as to form certain peroxides which further the oxidation process; addition of such compounds not only eliminates the oxidation inhibiting effect of the mercaptans but transforms the same into useful oxidation activating factors. This transformation is based upon the fact that certain compounds, particularly oxygen compounds of chlorine, are adapted to react with mercaptans so as to form compounds having a mercaptide like action, i. e. acting like mercaptides when exposed to oxygen; the thus formed compounds then react with the free oxygen during oxidation like mercaptides and, as stated above, form certain peroxides or peroxide like compounds which act as catalysts, greatly facilitating oxidation.

With the objects listed in the first paragraphs of this description and also with the additional object of avoiding all disadvantages of the above described known processes, my present invention mainly consists in processes of producing oxidation products from crude oil containing not only wax bearing substances but also asphaltic ingredients and oxidation inhibiting constituents comprising the steps of heating said crude oil to a temperature at which also the high melting point waxes contained in said crude oil are dissolved in the same, thereafter cooling said heated crude oil to a temperature at which mainly said high melting point waxes are precipitated from the same while substantially all lower melting point waxes remain in solution, removing the precipitate formed by said cooling, separating the light oils from said precipitate, adding to the thus treated precipitate a small percentage of at least one oxygen compound of chlorine which reacts with the oxidation inhibiting constituents still present in said precipitate, and thereafter subjecting the thus treated precipitate to oxidation in the presence of an oxygen containing gas.

It should be stressed that in order to obtain satisfactory results it is of great importance that the precipitate formed during cooling can separate from the solvent and is coarse enough for its rapid and complete removal.

Therefore, in order to enable formation and separation of the precipitate, the pour point of the solution must be held sufficiently low during precipitation. Furthermore, the viscosity of the solution should also be low, preferably not over 100 sec. Saybolt Universal at 100° F. since highly viscous oils cannot be filtered successfully at that temperature at which the precipitate has to be removed.

In conventional known processes these factors, namely the pour point and viscosity, are controlled by the nature of the solvent and the ratio in which it is used. Since all these known processes use as initial materials only deasphalted pretreated waxes and oils, the characteristics of which cannot be easily influenced, the pour point and viscosity of solutions containing such waxes and oils can be controlled only by the nature and ratio of the solvent used.

Contrary thereto, when as proposed by me crude oil is heated to a temperature at which all waxes and asphaltic ingredients are completely dissolved, the pour point and viscosity of this oil will be temporarily lowered; only after cooling and standing without stirring for a considerable time the crude oil slowly returns to its original pour point and viscosity.

My new process as defined above takes advantage of this so-called hysteresis of the pour point and viscosity of crude oil: by heating the crude oil to a temperature at which all waxes and asphaltic ingredients are dissolved, the pour point and viscosity of the crude oil will be lowered; thus addition of a solvent for dilution can often be avoided. If any light oils, e. g. gasoline, are added for dilution, this is done mainly to correct the conditions necessary for complete separation and successful filtration of the precipitate used as initial material for the oxidation step.

In this connection, I also wish to emphasize that it is of great importance that the above described separation of the precipitate is carried out before acid treatment, i. e. before removal of the asphaltic ingredients, since the same greatly reduce the congealing tendencies of the formed wax precipitate and are very useful as wax separation aids. Therefore, the removed wax precipitate occludes almost no light oils and only a small percentage of low melting point waxes and thus the amount of heavy oils present in the removed wax precipitate is negligible.

In this connection, it should also be stressed that the light oils forming the main part of the crude oil are excellent selective solvents for the separation of high melting point waxes from lower melting point waxes and heavy oils when used as described above, i. e. when the precipitation is carried out in the presence of asphaltic ingredients.

I have found that from heated solutions of amorphous waxes in crude oil or crude oil naphtha mixtures still containing asphaltic bodies substantially only the high melting point waxes precipitate together with some asphaltic bodies when these solutions are cooled as described above. I found also that under such conditions the wax precipitate can be easily separated from the crude oil and when filtered, a filter cake is formed which retains only a relatively small amount of solvent, i. e. crude oil, and almost no heavy oils. This filter cake can easily be washed with fresh gasoline to render it absolutely oil free as the asphaltic ingredients still present in the filter cake reduce the congealing tendency of the wax precipitate to such a degree that no swelling or dissolution of the high melting point waxes present in the precipitate takes place while in contact with the cold wash gasoline.

I found that best results for precipitating the wax in filterable form in accordance with my above described process are obtained when the crude oil shows a gravity A. P. I. of at least 30 to 40 degrees or is brought to such a gravity by dilution with higher gravity oils, e. g. light oils or gasoline.

In this connection, it should be stressed that there is a definite interrelation between the asphalt contents of the crude oil or the crude oil solution subjected to precipitation and the required gravity, namely the higher the asphalt contents, the lower the gravity required; this is due to the reduction of the congealing tendencies of the amorphous waxes by the asphalt content of the crude oil. In general the quantity of sulphuric acid and clay required for removal of the asphaltic bodies and bleaching of the obtained wax precipitate to comparable colors may be taken as a guide or even as a measure for determination of the necessary gravity of the oil, i. e. for the amount of light oil or gasoline to be added as solvent. Thus, it is evident that if crude oils having a low gravity, e. g. crude oil tank bottoms are used as initial materials, the same have to be diluted with light oils, naphtha, gasoline or other appropriate diluents until the obtained solution has a gravity A. P. I. of at least 30 to 40 degrees.

Crude oil tank bottoms consist of emulsions of water and crude oil and contain a relatively high percentage of high melting point waxes, i. e. usually from 5% to 10%, and among other impurities also asphaltic ingredients. I have found that if such low gravity crude oil emulsions, i. e. crude oil tank bottoms, are dissolved in crude oil or crude oil naphtha mixtures, heated and thereafter cooled as described above, the high melting point waxes contained in the dissolved crude oil emulsions would not form a substantially oil-free precipitate: since the emulsions are very stable, such precipitation would have the result that emulsified crude oil and water together with the high melting point waxes would be precipitated as described above and thus the high melting point waxes could not be obtained free from heavy oil.

Therefore, in case crude oil emulsions are used, it is of utmost importance that the emulsions be first broken and the water separated before the bottoms are dissolved in crude oil of higher gravity or crude oil naphtha mixtures; after the water is separated from the crude oil tank bottoms, i. e. after the crude oil tank bottoms are dehydrated, these dehydrated tank bottoms are diluted with oil of higher gravity, heated and cooled; as result of such cooling, all the high melting point waxes together with a small percentage of lower melting point waxes and some occluded crude oil will be precipitated; this precipitate will be almost free of heavy oils, as explained above.

It is known to produce waxes from tank bottoms, crude oil emulsions and the like. However, all processes for these purposes contain as main process steps dehydrating and cleaning of the tank bottoms followed by immediate distillation by which a still bottom is obtained which contains no light oils but still contains all asphaltic bodies and heavy oils besides the waxes. In the usual practice, this still bottom is then subjected to an acid treatment and filtered through clay in order to produce a base stock from which high melting point waxes may be derived. This base stock is thereafter subjected to repeated known solvent treatments to remove the heavy oils. My processes described in the preceding paragraphs do away with any solvent treatments after distillation and are thus not only much simpler but also substantially less expensive and cumbersome. In connection with above, it should be mentioned that substantially less sulphuric acid and bleaching clay are needed for my new processes than for those known at present, since in the known processes a great percentage of the acid and clay is used up by the heavy oils and soluble asphaltic ingredients not present in the precipitate obtained by my processes.

I have found that in order to remove all crude oil from the wax precipitate, it is in some cases advantageous to wash the same with cold gasoline so as to render the wax entirely oil free. This can be done without any danger of dissolution or swelling of the wax particles, since enough asphaltic bodies are co-precipitated with the high melting point waxes to reduce the congealing tendencies of the wax while it is in contact with the cold wash gasoline.

I have furthermore found that it is advisable to de-asphaltize and bleach the precipitate before distillation. In accordance with a preferred embodiment of my invention, this de-asphaltization by acid treatment or similar means is preferably carried out before removal of the wash gasoline; in this way, an acid sludge containing the asphaltic ingredients is formed which settles very fast and can be removed easily. It is also possible to bleach the thus obtained wax-gasoline solution without removal of the gasoline, e. g. by percolating it through a clay tower or contacting it with activated clay.

Thereafter, the precipitate is subjected to a treatment with an oxygen compound of chlorine which reacts as stated above with oxidation inhibiting constituents still present in the precipitate. I have found that this oxygen compound of chlorine reacts with the oxidation inhibiting constituents present in the precipitate—which mainly consist of sulphuric compounds, particularly mercaptans—in such a manner that on the one hand the oxidation inhibiting effects of these impurities are destroyed and on the other hand certain compounds having a mercaptide-like action are formed; these compounds in turn are essential for the formation of peroxides by the free oxygen added during the oxidation step; and such formation of peroxides is of eminent importance, since the same act as catalysts and greatly activate and further oxidation of the wax precipitate.

Thus, it is evident that addition of oxygen compounds of chlorine has a twofold combined effect resulting not only in elimination of the oxidation retarding effects of the oxidation inhibiting constituents present in the wax precipitate but also in the use of these same impurities, particularly mercaptans, for formation of certain compounds which have an oxidation increasing, activating and furthering action.

Various oxidizing agents, particularly oxygen compounds of chlorine, may be used for obtaining the above oxidation activating and furthering effects. As stated above, these oxidizing agents can best be defined by their common action, namely that they react with the oxidation inhibiting constituents, particularly mercaptans, in such a way as to form compounds which in turn react with the free oxygen added during oxidation in such a manner as to form peroxides or peroxide-like compounds which act as catalysts and activate, further and speed up oxidation. I have obtained good results with the most different oxygen compounds of chlorine, particularly chlorites and hypochlorites.

I have found that for these purposes I can also use any chemical compound adapted to form chlorine peroxide when reacting with the oxidation inhibiting constituents or with an acid, which latter might be added separately, if desired. Such compounds are for instance chlorates of alkalis and alkaline earth metals. Naturally, I may also use chlorine dioxide itself.

It should be stressed that the term "oxygen compound of chlorine" as used above and in the following description and claims is limited to and intended to cover only such oxygen compounds of chlorine which are reacting with oxygen inhibiting constituents, particularly mercaptans, so as to form such compounds which react with the free oxygen added during oxidation in such a manner as to form peroxides or peroxide-like compounds which act as catalysts and activate further and speed up oxidation.

I wish also to stress that the terms "hypochlorite," "chlorite" and "chlorates of alkalis and alkaline earth metals" as used above and in the following description and claims have to be interpreted and are limited in the same manner as the term "oxygen compound of chlorine" defined above.

As mentioned above, it is advisable to deasphaltize the precipitate before removal of the light oils. This is usually done in well-known way by treatment with acid, preferably concentrated sulphuric acid. If such an acid treatment is carried out, this has to be done before addition of the oxidizing agent or agents, as otherwise these oxidizing agents are co-precipitated together with these asphaltic constituents and removed with the sludge, thereby defeating the purpose for which they have been added. It should be mentioned that, if such an acid treatment precedes, the addition of an oxidizing agent or agents adapted to form chlorine peroxide only when reacting with an acid, it is mostly unnecessary to add a separate acid for purposes of this reaction: the sulphuric acid traces left from the above described sulphuric acid treatment in the precipitate are sufficient to react with the added oxidizing agent or agents and to form the chlorine peroxide needed for destroying the oxidation inhibiting impurities still present in the cleaned precipitate.

Although my above described process can be carried out in various ways, I prefer to include into the same the following process steps:

First of all, the crude oil containing wax bearing substances, asphaltic ingredients and water is freed of dirt and water by any suitable process. Then, the thus obtained dehydrated crude oil is brought to a gravity A. P. I. of at least 30 to 40 degrees by addition of gasoline or light oils, if it had a lower gravity; in case it has the required gravity, no gasoline, light oils or other solvents have to be added.

This crude oil is then heated in a tank with steam coils or by piping it through steam heated pipes to a temperature of about 160° to 180° F., i. e. until a clear solution is obtained. This solution might, however, contain small particles of undissolved asphaltic ingredients in suspension; the presence of such asphalt particles in no way impairs the results of my process.

Thereafter, the temperature of the crude oil or crude oil solution is lowered by well-known means to about 10° to 20° F. above that temperature at which the high melting point waxes contained in the heated crude oil are precipitated; during such cooling, it is advisable to keep the crude oil in motion so as to keep the fine particles of undissolved asphaltic ingredients in suspension and prevent precipitation of the same, as they are useful as nuclei for precipitation of the wax.

As next step, the fine granular precipitate of high melting point waxes and asphaltic bodies formed by this cooling is separated by cold settling, centrifuging or filtering during which separation the crude oil is cooled to the precipitation temperature of the high melting point waxes. I prefer to remove the wax precipitate by means of continuous rotary drum type vacuum filters which allow continuous and automatic filtering and washing of the wax cake.

Thereafter, if lighter colors are required, it is advisable to treat the filtered and washed precipitate with about 5% to 10% of concentrated sulphuric acid and to remove the formed acid sludge together with the asphaltic ingredients. Finally, the wax-gasoline solution can be bleached in well-known way and the wash gasoline removed by heat.

The thus obtained wax precipitate—if not washed with gasoline—consists mainly of high melting point waxes, a small percentage of low melting point waxes, light oils, asphaltic ingredients, certain oxidation inhibiting constituents and only traces of heavy oils; if washed with gasoline, it is absolutely oil free.

Thereafter, the low melting point waxes and light oils might be removed by heat treatment in well-known way; however, I wish to stress that it is also possible to omit this process step entirely and to remove these ingredients during the oxidation step itself.

The thus pretreated precipitate is then intimately mixed with a small percentage of an oxygen compound of chlorine or another compound which is adapted to form such an oxygen compound of chlorine, particularly chlorine dioxide, by reaction with the acid traces left from the above described acid treatment. This oxygen compound of chlorine reacts with the oxidation inhibiting ingredients, particularly the mercaptans, present in the precipitate and forms compounds which not only do not inhibit or retard oxidation but actually form with the oxygen added during oxidation peroxides or peroxide-like compounds having a catalytic action furthering and activating oxidation of the wax precipitate.

After such admixture of an oxygen compound of chlorine, the obtained mixture is subjected to oxidation in the presence of an oxygen containing gas. Such oxidation results in oxidation products which have a wax-like appearance and are comparable in many respects to bees, carnauba and montan wax. Thus, most of these oxidation products have a molecular weight of between 410 and 700, preferably between 500 and 650, a saponification number of less than 100, and an acid number of less than 25.

As mentioned above, I may use as initial materials for my processes the most different types of crude oils. Thus, the term "crude oil" as used above and in the following description and claims is intended to define not only crude oils of usual type but to comprehend also tank bottoms, crude oil solutions and emulsions, waxy sediments, and other wax bearing substances which contain, besides high melting point waxes, also asphaltic ingredients, oxidation inhibiting constituents and hydrocarbons which are liquid at ordinary temperatures, as light oils and gasoline.

The following examples will clearly disclose the most important characteristic features of my present invention. I wish to stress that these examples are not intended to limit my present invention to the features disclosed in the same. The scope of my present invention is defined exclusively by the appended claims.

*Example I*

Crude oil tank bottom separated by setting from East Texas crude oil stored in tanks is separated from water and sand in the usual way by heating to about 160° F. and keeping the oil at this temperature over a period of several days. The water oil emulsion of the crude oil tank bottom is broken by this treatment and the water is then removed.

The dehydrated tank bottom has a gravity A. P. I. of 32.5 degrees and consists of 56% of ingredients distillable in a vacuum at 4 mm. pressure and a temperature of 650° F., and of 43% of a black residue. This black residue consists of about 23% of ingredients removable by acid treatment, about 40% of dark brown high melting point waxes and about 37% of a mixture of heavy oils and lower melting point waxes.

This dehydrated crude oil tank bottom is then diluted by adding thereto about the double amount of gasoline having a gravity A. P. I. of 55 degrees, thus obtaining a crude oil-gasoline solution having a gravity A. P. I. of 45.4 degrees. Addition of this gasoline is combined with heating of the dehydrated tank bottom. This is done by pumping the gasoline directly into a steam heated pipe through which the tank bottom is pumped so that a very thorough mixture, i. e. crude oil-gasoline solution having a temperature of about 175° F., is obtained; in this solution, the tank bottom and also the high melting point waxes contained in the same, are completely dissolved.

This heated solution is then pumped through pipes provided with jackets for cooling water, until its temperature is reduced to about 90° to 95° F. At this temperature, the cooled crude oil-gasoline solution is discharged into a slurry tank and further cooled in the same during several hours until a final temperature of about 80° F. is reached. The slurry formed in the tank flows by gravity to a rotary drum type continuous vacuum filter.

The wax cake on the filter is washed with fresh cold gasoline. The thus washed dry cake discharged from the filter is then heated and pumped in molten state to a treating tank and treated with about 4% of sulphuric acid at 170 to 180° F. The precipitated sludge is removed.

The thus treated wax precipitate is then subjected in known way to a bleaching treatment with fuller's earth or activated clay. Thereafter, the thus acid treated and bleached precipitate is subjected to a heat treatment so as to remove the light oils occluded in the precipitate and the traces of gasoline left from the washing step.

The thus obtained cleaned and bleached precipitate which, however, still contains the oxidation inhibiting constituents of the original crude oil is then pumped into a reaction tank where it is slowly heated to about 320° F. When this temperature is reached, about 1% of an aqueous 50% solution of sodium chlorite is slowly added to the heated precipitate while passing air through the mixture. Thereafter, the mixture is held at this oxidation temperature for about twelve hours; during this time, air is blown continuously through the reaction chamber.

The thus obtained oxidation product might be pumped through a double-pipe cooling system and mixed with gasoline in the same way as described above in connection with dissolving of the dehydrated crude oil tank bottom. Then, the mixture consisting of the obtained oxidation products dissolved in gasoline is cooled to about 80° F. and the precipitated slurry is filtered off; the thus cleaned oxidation product is then stripped of gasoline by combined heat and steam treatment.

By this process a very hard dark brown wax is obtained which is soluble in benzene, has a melting point of 193.5° F., a saponification number of 56 and strongly resembles crude montan wax.

*Example II*

A precipitate obtained as described in Example I is de-asphaltized and bleached as described above. Thereafter, it is treated with a small percentage of anhydrous aluminum chloride and clay. Thus, a precipitate consisting mainly of very light colored yellowish wax is obtained which has a melting point of 187° F. and an oil content of less than 1%.

This precipitate is then heated to 260° F. and mixed with between 1% and 2% of an aqueous 50% solution of sodium chlorite and with between one quarter and one half per cent of manganese palmitate or manganese stearate. Thereafter, air is blown through this mixture for about one hour and the temperature gradually decreased to about 220° F. The mixture is held at this temperature for about seven hours while the blowing of air is continued. Then the mixture is left to settle for several hours; during settling a very light colored yellowish wax separates from a small percentage of a sediment consisting mainly of catalyst and insoluble materials.

The thus obtained oxidized wax has an acid number of 20.7, a saponification number of 87.5, a melting point of 157° F., a plastic consistency and is very well adapted as a beeswax substitute.

*Example III*

A precipitate pretreated as described in Example II is transferred to a reaction chamber where it is heated to 250° F. and kept at this temperature for eight hours while air is blown through it. Then, about 2% of anhydrous boric acid is added and the mixture stirred by air while kept at the same temperatue. For stirring the mixture it is also possible to use nitrogen or carbon dioxide instead of air in order to avoid further oxidation while stirring. It is also possible to use instead of air sulphur dioxide which has a bleaching effect.

The oxidation product thus obtained is diluted with gasoline as explained above, cooled and the precipitated wax filtered and stripped of gasoline.

A very light colored hard wax is obtained; the same has a molecular weight of 560, a melting point of 186° F., an acid number of 6 and a saponification number of 60.

*Example IV*

One part of the oxidation product obtained as described above in Example III is dissolved in six parts of ethyl acetate and stirred for two hours while activated carbon is added. The solution is filtered, separated from undissolved reaction products and thereafter cooled to 100° F. Then, the obtained precipitate is filtered and the remaining solvent removed by heat and steam treatment.

An almost white wax is obtained; the same has an average molecular weight of 576, a melting point of 194° F., an acid number of 8, a saponification number of 55, is very hard and in many respects resembles carnauba wax.

It will be understood that each of the elements described above, or two or more together, may also find a useful application in other types of oxidation processes differing from the types described above.

While I have illustrated and described the invention as embodied in oxidation processes using so-called crude oil as initial material I do not intend to be limited to the details shown, since various modifications and changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A process of producing oxidized hydrocarbon waxes from crude oil containing not only wax bearing substances but also light oils, asphaltic ingredients and oxidation inhibiting constituents comprising the steps of heating said crude oil to a temperature at which also the high melting point waxes contained in said crude oil are dissolved in the same, thereafter cooling said heated crude oil to a temperature at which mainly said high melting point waxes are precipitated from the same while substantially all lower melting point waxes remain in solution, removing the precipitate formed by said cooling, separating the light oils from said precipitate, adding to the thus treated precipitate a small percentage of at least one oxygen compound of chlorine which reacts with the oxidation inhibiting constituents still present in said precipitate, and thereafter subjecting the thus treated precipitate to oxidation in the presence of an oxygen containing gas.

2. A process of producing oxidized hydrocarbon waxes from crude oil having a gravity A. P. I. of at least 30 to 40 degrees and containing not only wax bearing substances but also light oils asphaltic ingredients and oxidation inhibiting constituents comprising the steps of heating said crude oil to a temperature at which also the high melting point waxes contained in said crude oil are at least substantially dissolved, cooling the thus heated crude oil while keeping it in motion to a temperature at which substantially only said high melting point waxes are precipitated from said crude oil, removing the thus formed precipitate, separating the light oils from said precipitate, intimately mixing with the thus treated precipitate a small percentage of at least one oxygen compound of chlorine which reacts with said oxidation inhibiting constituents still present in said precipitate, and thereafter subjecting the thus treated precipitate to oxidation in the presence of an oxygen containing gas.

3. A process of producing oxidized hydrocarbon waxes from crude oil having a gravity A. P. I. of at least 30 to 40 degrees and containing not only wax bearing substances including not only low melting point and high melting point waxes but also light oils asphaltic ingredients and oxidation inhibiting constituents comprising the steps of heating said crude oil to a temperature at which at least all said low melting point waxes are dissolved, thereafter cooling the thus heated crude oil to a temperature of about 85° F., collecting the precipitate formed by said cooling, separating the light oils from said precipitate, adding to the thus treated precipitate a small percentage of chlorine dioxide, and thereafter subjecting the thus treated precipitate to oxidation in the presence of an oxygen containing gas.

4. A process of producing oxidized hydrocarbon waxes from paraffin base crude oil containing besides wax bearing substances including high melting point paraffin waxes also light oils asphaltic ingredients and oxidation inhibiting constituents comprising the steps of heating said crude oil to a temperature at which also said high melting point paraffin waxes contained in said crude oil are dissolved in the same, thereafter cooling said heated crude oil to about 85° F. at which temperature substantially only said high melting point paraffin waxes are precipitated, removing the thus formed precipitate, separating the light oils contained in said precipitate from the same, and thereafter subjecting the thus treated precipitate to oxidation in the presence of an oxygen containing gas and a small percentage of an oxygen compound of chlorine.

5. A process of producing oxidized hydrocarbon waxes from dehydrated crude oil tank bottom containing besides a very high percentage of wax bearing substances including high melting point waxes also light oils asphaltic ingredients and oxidation inhibiting constituents, said process comprising diluting said dehydrated crude oil tank bottom with a liquid petroleum solvent, heating said diluted dehydrated crude oil tank bottom to about 180° F., cooling the thus heated diluted dehydrated crude oil tank bottom while keeping it in motion to a temperature at which substantially only said high melting point waxes are precipitated from said diluted dehydrated crude oil tank bottom while a high percentage of the lower melting point waxes contained in said diluted dehydrated crude oil tank bottom remain in solution, removing the thus formed precipitate containing only a small percentage of lower melting point waxes while being substantially free of heavy oils, separating the light oils occluded in said precipitate from the same, intimately mixing with the thus treated precipitate an oxidizing agent selected from the group of chlorates of alkalis and alkaline earth metals adapted to react with said oxidation inhibiting constituents still present in said precipitate, and thereafter subjecting the thus treated precipitate to oxidation in the presence of an oxygen containing gas.

6. A process of producing oxidized hydrocarbon waxes from crude oil tank bottom containing besides a very high percentage of wax bearing substances including high melting point waxes also light oils asphaltic ingredients and oxidation inhibiting constituents, said process comprising dehydrating said crude oil tank bottom, diluting said dehydrated crude oil tank bottom with a liquid petroleum solvent, heating said diluted dehydrated crude oil tank bottom to at least 180° F., cooling the thus heated diluted dehydrated crude oil tank bottom while keeping it in motion to between 80 and 90° F. at which temperature substantially only said high melting point waxes are precipitated from said diluted dehydrated crude oil tank bottom while a high percentage of the lower melting point waxes contained in said diluted dehydrated crude oil tank bottom remain in solution, removing the thus formed precipitate consisting mainly of high melting point waxes and containing only a small percentage of lower melting point waxes while being substantially free of heavy oils, separating the light oils occluded in said precipitate from the same, adding to the thus treated precipitate at least one hypochlorite adapted to react with said oxidation inhibiting constituents, and subjecting the thus treated precipitate to oxidation in the presence of an oxygen containing gas.

7. A process of producing oxidized hydrocarbon waxes from crude oil tank bottom containing besides a very high percentage of wax bearing substances including high melting point waxes also light oils asphaltic ingredients, water and oxidation inhibiting constituents, said process comprising removing said water from said crude oil tank bottom, diluting said water-free crude oil tank bottom with a liquid petroleum solvent in such a manner as to obtain a water-free tank bottom solution having a gravity A. P. I. of at least 35 to 40 degrees, heating said water-free tank bottom solution to about 180° F., cooling the thus heated water-free tank bottom solution while keeping it in motion to a temperature being between 10 and 20° F. higher than the precipitation temperature at which substantially only said high melting point waxes are precipitated from said water-free tank bottom solution, further cooling said pre-cooled water-free tank bottom solution to said precipitation temperature, separating from it the formed precipitate containing only a small percentage of lower melting point waxes while being substantially free of heavy oils, subjecting the thus formed precipitate to a distillation process so as to remove the lower melting point waxes and light oils occluded in the same, and thereafter subjecting the thus treated precipitate to oxidation in the presence of an oxygen containing gas and a small percentage of chlorine peroxide.

8. In the process of producing oxidized hydrocarbon waxes from at least substantially water-free crude oil, the steps of heating said crude oil to a temperature at which the high melting point waxes contained in the same are dissolved, cooling said heated crude oil in the presence of asphaltic ingredients from a temperature at which the high melting point waxes contained in said crude oil are dissolved in the same to a temperature at which substantially all said high melting point waxes and only a small percentage of the lower melting point waxes contained in said crude oil are precipitated from the same, separating the thus formed precipitate from said thus cooled crude oil, admixing to the thus obtained precipitate a small percentage of an oxygen compound of chlorine, and subjecting the thus obtained mixture to oxidation in the presence of an oxygen containing gas.

9. A process of producing oxidizing hydrocarbon waxes from crude oil tank bottom containing besides a very high percentage of wax bearing substances including high melting point waxes also asphaltic ingredients water and oxidation inhibiting constituents, said process comprising removing said water from said crude oil tank bottom, diluting thereafter said at least substantially water-free crude oil tank bottom with a liquid petroleum solvent, heating said diluted crude oil tank bottom to above 180° F., cooling the thus heated diluted crude oil tank bottom while keeping it in motion to between 80 and 90° F. at which temperature substantially only said high melting point waxes are precipitated from said diluted crude oil tank bottom while a high percentage of the lower melting point waxes contained in said diluted crude oil tank bottom remain in solution, removing the thus formed precipitate containing only a small percentage of lower melting point waxes and being substantially free of heavy oils, treating said precipitate while in liquid state with concentrated sulphuric acid, removing the resulting sludge, mixing thereafter the precipitate with a small percentage of substances selected from the group consisting of chlorates of alkalis and alkaline earth metals, and thereafter subjecting the thus treated precipitate to oxidation in the presence of an oxygen containing gas.

10. A process of producing oxidized hydrocarbon waxes from dehydrated crude oil tank bottom containing besides a very high percentage of wax bearing substances including high melting point waxes also asphaltic ingredients and oxidation inhibiting constituents, said process comprising removing said water from said crude oil tank bottom, diluting thereafter said at least substantially water-free crude oil tank bottom with a liquid petroleum solvent, heating said diluted crude oil tank bottom to above 180° F., cooling the thus heated diluted crude oil tank bottom while keeping it in motion to between 80 and 90° F. at which temperature substantially only said high melting point waxes are precipitated from said diluted crude oil tank bottom while a high percentage of the lower melting point waxes contained in said diluted crude oil tank bottom remain in solution, removing the thus formed precipitate containing only a small percentage of lower melting point waxes and being substantially free of heavy oils, treating said precipitate while in liquid state with concentrated sulphuric acid, removing the resulting sludge, mixing the thus obtained substantially sludge-free precipitate with a bleaching absorbent agent and steam, removing said bleaching absorbent agent after bleaching, intimately mixing the thus bleached precipitate with at least one chlorite adapted to react with the oxidation inhibiting constituents still present in said precipitate, and thereafter subjecting the thus treated precipitate to oxidation in the presence of an oxygen containing gas.

11. A process of producing oxidized hydrocarbon waxes from crude oil containing not only wax bearing substances but also asphaltic ingredients and oxidation inhibiting constituents comprising the steps of heating said crude oil to a temperature at which also the high melting point waxes contained in said crude oil are dissolved in the same, thereafter cooling said heated crude oil to a temperature at which mainly said high melting point waxes are precipitated from the same while substantially all lower melting point waxes remain in solution, removing the precipitate formed by said cooling, adding to said precipitate a small percentage of at least one oxygen compound of chlorine which reacts with the oxidation inhibiting constituents still present in said precipitate, and thereafter subjecting the thus treated precipitate to oxidation in the presence of an oxygen containing gas.

12. In the process of producing oxidized hydrocarbon waxes from at least substantially water-free crude oil, the steps of heating said crude oil to a temperature at which the high melting point waxes contained in the same are dissolved, cooling said heated crude oil in the presence of asphaltic ingredients from a temperature at which the high melting point waxes contained in said crude oil are dissolved in the same to a temperature at which substantially all said high melting point waxes and only a small percentage of the lower melting point waxes contained in said crude oil are precipitated from the same, admixing to said precipitate a small percentage of an oxygen compound of chlorine, and subjecting the thus obtained mixture to oxidation in the presence of an oxygen containing gas.

13. A process of producing oxidized hydrocarbon waxes from crude oil containing not only wax bearing substances but also asphaltic ingredients and oxidation inhibiting constituents comprising the steps of heating said crude oil to a temperature at which also the high melting point waxes contained in said crude oil are dissolved in the same, thereafter cooling said heated crude oil to a temperature at which mainly said high melting point waxes are precipitated from the same while substantially all lower melting point waxes remain in solution, removing the precipitate formed by cooling, adding to said precipitate a small percentage of at least one oxygen compound of chlorine which reacts with the oxidation inhibiting constituents still present in said precipitate, subjecting the thus treated precipitate to oxidation in the presence of an oxygen containing gas and thereafter separating the lower melting point oxidation products by solvent extraction.

ERNEST STOSSEL.

REFERENCES CITED

The following references are of record in the file of this patent:

UNITED STATES PATENTS

| Number | Name | Date |
| --- | --- | --- |
| 2,119,940 | Carr et al. | June 7, 1938 |
| 1,983,672 | Labarethe et al. | Dec. 11, 1934 |
| 2,000,222 | Dietrich et al. | May 7, 1935 |
| 1,788,799 | Luther et al. | Jan. 13, 1931 |
| 2,186,909 | Pollock | Jan. 9, 1940 |
| 2,370,228 | Bruun et al. | Feb. 27, 1945 |
| 2,131,195 | Schneider et al. | Sept. 27, 1938 |
| 2,306,201 | Wiles | Dec. 22, 1942 |